US010334167B2

(12) United States Patent
Onomura

(10) Patent No.: US 10,334,167 B2
(45) Date of Patent: Jun. 25, 2019

(54) IMAGING APPARATUS, IMAGING METHOD, AND NON-TRANSITORY STORAGE MEDIUM STORING IMAGING PROGRAM

(71) Applicant: Olympus Corporation, Hachioji-shi (JP)

(72) Inventor: Kenichi Onomura, Hino (JP)

(73) Assignee: Olympus Corporation, Tokyo (JP)

( * ) Notice: Subject to any disclaimer, the term of this patent is extended or adjusted under 35 U.S.C. 154(b) by 1 day.

(21) Appl. No.: 15/672,237

(22) Filed: Aug. 8, 2017

(65) Prior Publication Data

US 2018/0048818 A1    Feb. 15, 2018

(30) Foreign Application Priority Data

Aug. 10, 2016 (JP) ................................ 2016-157700

(51) Int. Cl.
 *H04N 5/232*  (2006.01)
 *H04N 5/235*  (2006.01)

(52) U.S. Cl.
 CPC ....... *H04N 5/23245* (2013.01); *H04N 5/2357* (2013.01); *H04N 5/23229* (2013.01); *H04N 5/23293* (2013.01); *H04N 5/2353* (2013.01)

(58) Field of Classification Search
 None
 See application file for complete search history.

(56) References Cited

U.S. PATENT DOCUMENTS

| | | | | |
|---|---|---|---|---|
| 7,289,144 | B2 * | 10/2007 | Arazaki | H04N 5/235 348/228.1 |
| 8,102,437 | B2 * | 1/2012 | Matsumoto | H04N 5/2357 348/226.1 |
| 8,462,229 | B2 * | 6/2013 | Yost | H04N 5/2353 348/226.1 |
| 2004/0012692 | A1 | 1/2004 | Arazaki | |
| 2009/0316020 | A1 * | 12/2009 | Ezawa | G06T 7/0004 348/226.1 |
| 2010/0013953 | A1 * | 1/2010 | Niikura | H04N 5/2353 348/226.1 |
| 2018/0007249 | A1 * | 1/2018 | Matsumoto | G06K 9/6215 |

* cited by examiner

*Primary Examiner* — James M Hannett
(74) *Attorney, Agent, or Firm* — John C. Pokotylo; Pokotylo Patent Services

(57) ABSTRACT

An imaging apparatus includes an imaging unit, an image processor, and a controller. The imaging unit images a subject field to generate an image in a set imaging drive mode of a first imaging drive mode for live-view display and a second imaging drive mode for still image shooting. The image processor subjects the image to basic image processing and special image processing, if necessary, the special image processing including image processing to emphasize flicker stripes occurring in the image. The controller sets the imaging drive mode to the first imaging drive mode and instructs the image processor to perform the basic image processing, when the normal live-view mode is set, and sets the imaging drive mode to the second imaging drive mode and instructs the image processor to perform the basic image processing and the special image processing, when the adjustment live-view mode is set.

10 Claims, 6 Drawing Sheets

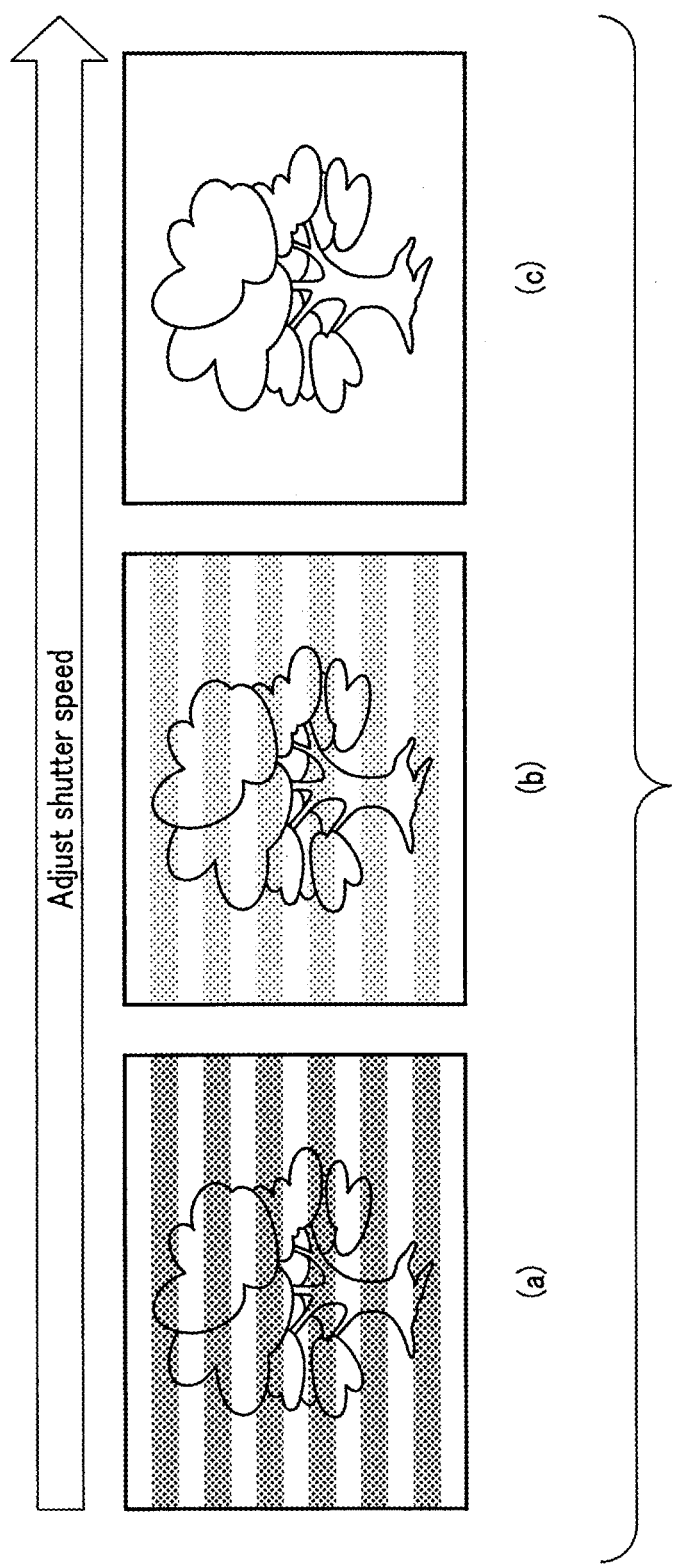
F I G. 3

IMAGING APPARATUS, IMAGING METHOD, AND NON-TRANSITORY STORAGE MEDIUM STORING IMAGING PROGRAM

CROSS-REFERENCE TO RELATED APPLICATIONS

This application is based upon and claims the benefit of priority from prior Japanese Patent Application No. 2016-157700, filed Aug. 10, 2016, the entire contents of which are incorporated herein by reference.

BACKGROUND OF THE INVENTION

1. Field of the Invention

The present invention relates to an imaging apparatus, an imaging method, and a non-transitory storage medium storing an imaging program.

2. Description of the Related Art

It is known that flicker stripes may occur in the taken image, when imaging is performed under a light source that repeats flicker, such as a fluorescent light. To suppress occurrence of such flicker stripes, an imaging apparatus disclosed in US2004/0012692 detects occurrence of flicker stripes by comparing images acquired by a plurality of times of imaging with different shutter times (exposure times). When occurrence of flicker stripes are detected, the imaging apparatus of US2004/0012692 sets the shutter timing (timing of start of exposure) to the value integer times as large as the flicker cycle, to suppress occurrence of flicker stripes in imaging. As the shutter time in each of a plurality of times of imaging, the imaging apparatus of US2004/0012692 sets the shutter time to the shortest shutter time with which no flicker stripes occurs, and a shutter time shorter than the shortest shutter time.

BRIEF SUMMARY OF THE INVENTION

According to a first aspect of the invention, there is provided an imaging apparatus comprising: an imaging unit which images a subject field to generate an image, in a set imaging drive mode in at least two modes of a first imaging drive mode suitable for live-view display and a second imaging drive mode suitable for still image shooting; an image processor which subjects the image generated by the imaging unit to basic image processing serving as image processing necessary for display, and special image processing, if necessary, the special image processing including image processing to emphasize flicker stripes occurring in the image; an operating unit including an operating member to set a mode of the live-view display to a normal live-view mode or an adjustment live-view mode; and a controller which sets the imaging drive mode to the first imaging drive mode and instructs the image processor to perform the basic image processing, when the normal live-view mode is set, and sets the imaging drive mode to the second imaging drive mode and instructs the image processor to perform the basic image processing and the special image processing, when the adjustment live-view mode is set.

According to a second aspect of the invention, an imaging method comprising: imaging a subject field to generate an image, in a set imaging drive mode in at least two modes of a first imaging drive mode suitable for live-view display and a second imaging drive mode suitable for still image shooting; setting a mode of live-view display to a normal live-view mode or an adjustment live-view mode; and setting the imaging drive mode to the first imaging drive mode to perform imaging repeatedly, and subjecting the generated image to basic image processing serving as image processing necessary for display, when the normal live-view mode is set, and setting the imaging drive mode to the second imaging drive mode to perform imaging repeatedly, and subjecting the generated image to the basic image processing and special image processing, when the adjustment live-view mode is set, the special image processing including image processing to emphasize flicker stripes occurring in the image.

According to a third aspect of the invention, a computer-readable non-transitory recording medium recording an imaging program to be executed by a computer of an imaging apparatus, the imaging program including: imaging a subject field to generate an image, in a set imaging drive mode in at least two modes of a first imaging drive mode suitable for live-view display and a second imaging drive mode suitable for still image shooting; setting a mode of live-view display to a normal live-view mode or an adjustment live-view mode; and setting the imaging drive mode to the first imaging drive mode to perform imaging repeatedly, and subjecting the generated image to basic image processing serving as image processing necessary for display, when the normal live-view mode is set, and setting the imaging drive mode to the second imaging drive mode to perform imaging repeatedly, and subjecting the generated image to the basic image processing and special image processing, when the adjustment live-view mode is set, the special image processing including image processing to emphasize flicker stripes occurring in the image.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 3 is a diagram for explaining an outline of adjustment of the shutter speed value in an adjustment live-view mode;

DETAILED DESCRIPTION OF THE INVENTION

Figure 1:
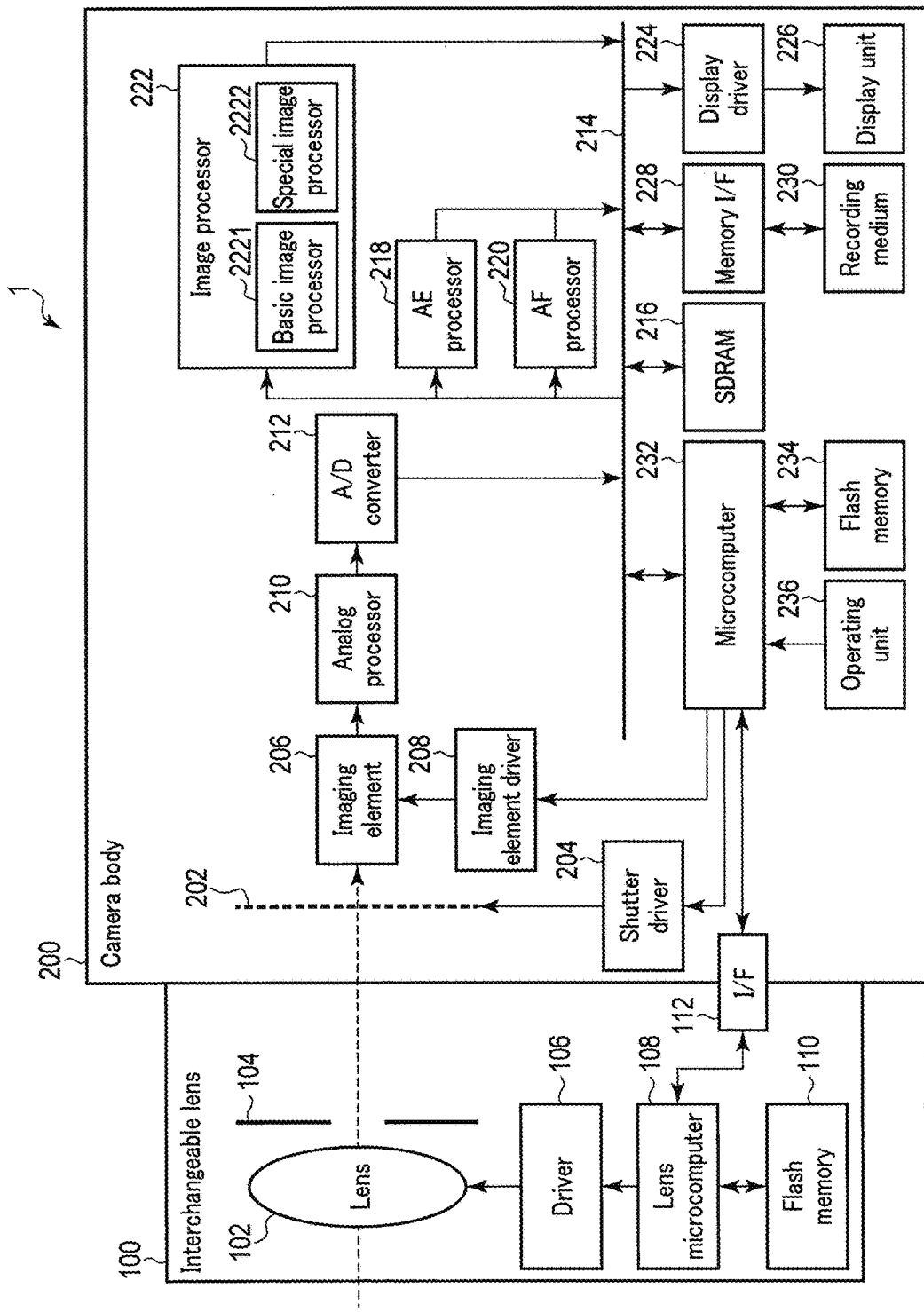
FIG. 1 is a block diagram illustrating a configuration of an example of a camera system serving as an example of an imaging apparatus according to an embodiment of the present invention.

An embodiment of the present invention will be explained hereinafter with reference to drawings. FIG. 1 is a block diagram illustrating a configuration of an example of a camera system serving as an imaging apparatus according to an embodiment of the present invention. A camera system 1 illustrated in FIG. 1 includes an interchangeable lens 100, and a camera body 200. The interchangeable lens 100 is configured to be attachable to and detachable from the camera body 200.

When the interchangeable lens 100 is attached to the camera body 200, the interchangeable lens 100 and the camera body 200 are connected to be capable of communicating with each other. The camera system 1 is not always a lens-interchangeable camera system. For example, the camera system 1 may be a lens-integrated camera system.

The interchangeable lens 100 includes an imaging lens 102, a diaphragm 104, a driver 106, a lens microcomputer 108, and a flash memory 110.

The imaging lens 102 is an optical system to image a light flux from the subject on an imaging element 206 of the camera body 200. The imaging lens 102 includes a single or a plurality of lenses including a focus lens. The imaging lens 102 may be formed as a zoom lens. The diaphragm 104 is disposed on an optical axis of the imaging lens 102, and has its aperture that is configured to be variable. The diaphragm 104 regulates the light flux coming from the subject, passing through the imaging lens 102 and made incident on the imaging element 206. The driver 106 having a function as a drive unit drives the focus lens of the imaging lens 102, and drives the diaphragm 104, based on a control signal from the lens microcomputer 108.

The lens microcomputer 108 is configured to be capable of communicating with a microcomputer 232 of the camera body 200 through an interface (I/F) 112 serving as a lens communication unit. The lens microcomputer 108 controls the driver 106, in accordance with a program stored in the flash memory 110, under the control of the microcomputer 232. The lens microcomputer 108 also transmits various types of information, such as lens information, stored in the flash memory 110 to the microcomputer 232 through the I/F 112. The lens microcomputer 108 is not always configured as a microcomputer, but may be formed of an ASIC or a FPGA, etc.

The flash memory 110 stores a program necessary for operations of the interchangeable lens 100. The flash memory 110 also stores lens information relating to the interchangeable lens 100. The lens information includes, for example, information of a focal length of the imaging lens 102, and information of aberration of the imaging lens 102.

The camera body 200 includes a shutter 202, a shutter driver 204, the imaging element 206, an imaging element driver 208, an analog processor 210, an analog/digital (A/D) converter 212, a bus 214, an SDRAM 216, an AE processor 218, an AF processor 220, an image processor 222, a display driver 224, a display unit 226, a memory interface (I/F) 228, a recording medium 230, the microcomputer 232, a flash memory 234, and an operating unit 236. Each block of the camera body 200 is formed of, for example, hardware. However, each block is not always formed of hardware, but may be formed of software. Each block of the camera body 200 is not always formed of single hardware or software, but may be formed of a plurality of hardware or software applications.

The shutter 202 is configured to be openable and closable, to adjust the incident time (exposure time of the imaging element 206) of the light flux from the subject on the imaging element 206. For example, a focal plane shutter is adopted as the shutter 202. The shutter driver 204 drives the shutter 202, based on a control signal from the microcomputer 232.

The imaging element 206 functioning as an imaging unit is disposed on the optical axis of the imaging lens 102, behind the shutter 202, and in a position in which an image of the light flux from the subject is formed with the imaging lens 102. The imaging element 206 includes pixels arranged in a two-dimensional or three-dimensional manner. Each of the pixels generates an electric charge corresponding to the light reception amount. A color filter is formed in each of the pixels. The imaging element 206 as described above images the subject, to generate an image signal. The imaging element 206 may include focus detection pixels. The imaging element driver 208 drives the imaging element 206. The imaging element driver 208 also controls reading of the image signal generated with the imaging element 206.

The analog processor 210 performs analog processing, such as amplification, on the image signal read out of the imaging element 206. The A/D converter 212 converts the image signal output from the analog processor 210 into image data of a digital form.

The bus 214 is connected with the A/D converter 212, the SDRAM 216, the AE processor 218, the AF processor 220, the image processor 222, the display driver 224, and the memory I/F 228, to function as a transmission path to transmit various types of data generated in these blocks.

The SDRAM 216 is an electrically rewritable memory, and temporarily stores various types of data, such as image data output from the A/D converter 212 or the image processor 222, and processing data in the AE processor 218, the AF processor 220, or the microcomputer 232. A DRAM may be used for temporary storage.

The AE processor 218 performs automatic exposure (AE) processing. Specifically, the AE processor 218 sets imaging conditions (the aperture value and the shutter speed), based on the subject luminance acquired from the image data or the like.

The AF processor 220 performs auto focus (AF) processing.

Specifically, the AF processor 220 controls driving of the focus lens included in the imaging lens 102, based on the focus information acquired from the image data or the like. The focus information may be, for example, an AF evaluation value (contrast value) calculated from the image data, or a defocusing value calculated from the output of the focus detection pixels or the like.

The image processor 222 subjects the image data to various types of image processing. The image processor 222 includes a basic image processor 2221, and a special image processor 2222.

The basic image processor 2221 and the special image processor 2222 may be formed of hardware, may be formed of software, or a combination of hardware and software. The basic image processor 2221 subjects the image data to basic image processing necessary for displaying and recording the image. The basic image processing includes, for example, white balance (WB) correction processing, color reproduction processing, gradation correction processing, edge emphasis processing, and noise reduction processing. The special image processor 2222 subjects the image data to special image processing to provide the image data with special visual effects. The special image processing includes, for example, trimming, and contrast emphasis processing. These special image processing is used for, for example, emphasis display of flicker stripes in an adjustment live-view mode described later.

The display driver 224 drives the display unit 226 to display an image based on the image data processed with the image processor 222 on the display unit 226. The display unit 226 is a display unit, such as a liquid crystal display and an organic EL display, and disposed, for example, on the back surface of the camera body 200. The display unit 226 is not always provided on the camera body 200. The display unit 226 may be, for example, a TV monitor or the like connected to be capable of communicating with the camera body 200.

The memory I/F 228 mediates data transfer from the recording medium 230 to the bus 214, and data transfer from the bus 214 to the recording medium 230. The recording medium 230 is, for example, a flash memory, and configured to be installed in or loaded into the camera body 200. The recording medium 230 records image data processed with the image processor 222 as an image file of a predetermined form.

The microcomputer 232 is a control unit controlling each block of the camera body 200, in accordance with a program stored in the flash memory 234. The microcomputer 232 is not always configured as a microcomputer, but may be configured with an ASIC or an FPGA or the like.

The flash memory 234 stores a program necessary for operations of the camera body 200. The flash memory 234 also stores information necessary for various types of processing of the camera body 200. The information includes, for example, information of parameters of image processing.

The operating unit 236 includes various types of operating buttons, such as a power button to turn on and off the power of the camera body 200, a release button to issue an instruction to shoot an still image, a video button to start and end video recording, a playback button to issue an instruction to play back the shot and recorded still image and/or video, and a menu button to issue an instruction to change and/or set the various setting values/modes of the camera body 200, and various operating members such as a touch panel having similar functions to operations of the various operating button. The operating unit 236 also includes an adjustment live-view button serving as an operating member to set the live-view display mode of the camera body 200 to one of a normal live-view mode and an adjustment live-view mode. The normal live-view mode is a live-view display mode to perform live-view display to allow the user to perform framing. The adjustment live-view mode is a live-view display mode to perform live-view display to allow the user to perform adjustment to suppress occurrence of flicker stripes that can occur under a flickering light source. The operating unit 236 as described above senses the operating state of each of the various operating members, and outputs a signal indicating a sensing result to the microcomputer 232.

Figure 2:
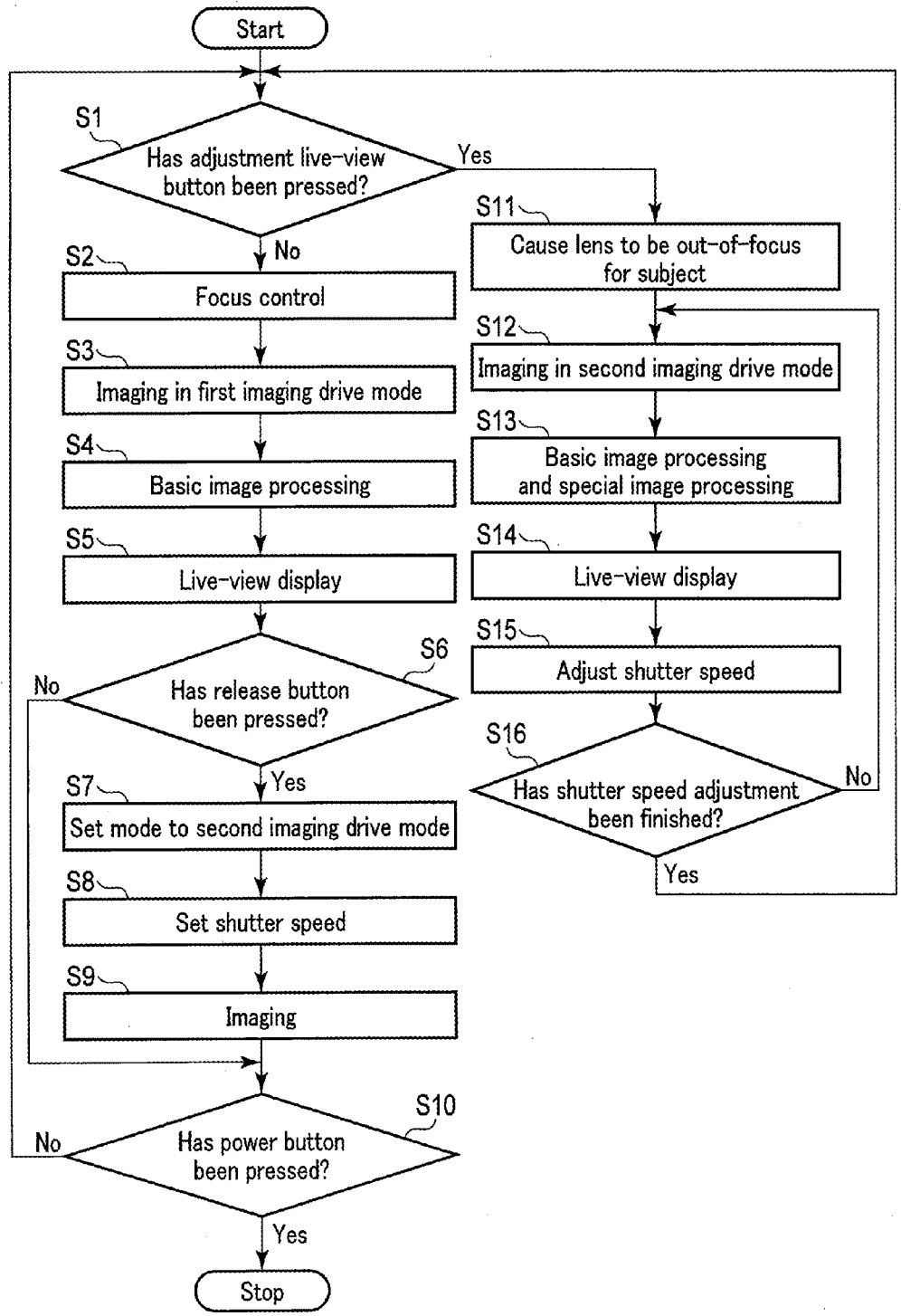
FIG. 2 is a flowchart illustrating operations of the camera system.

The following is explanation of operations of the camera system 1 according to the present embodiment. FIG. 2 is a flowchart illustrating operations of the camera system 1. The operations in FIG. 2 are mainly controlled with the microcomputer 232. The operations in FIG. 2 are operations in the imaging mode of the camera system 1. The camera system 1 may include a playback mode to play back the image file recorded on the recording medium 230.

The operations in FIG. 2 are started when the power of the camera body 200 is turned on. At Step S1, the microcomputer 232 determines whether the adjustment live-view button is operated by the user. At Step S1, when the microcomputer 232 determines that the adjustment live-view button is not operated by the user, the process proceeds to Step S2. At Step S1, when the microcomputer 232 determines that the adjustment live-view button is operated by the user, the process proceeds to Step S11 to perform processing in the adjustment live-view mode.

At Step S2, the microcomputer 232 instructs the AF processor 220 to perform focus control. In response to the instruction, the AF processor 220 performs AF processing. For example, when the AF processing is performed in a hill climbing method, the AF processor 220 requests the lens microcomputer 108 to drive the focus lens by a predetermined amount each time. Thereafter, the AF processor 220 calculates an AF evaluation value from each piece of image data successively acquired through the imaging element 206 with drive of the focus lens. The AF processor 220 stops the focus lens at a position with the maximum AF evaluation value. After such focus control, the process proceeds to Step S3. By the focus control described above, the focus lens is focused on the subject. The subject serving as the focus target of the focus lens is an object designated by the user, an object in the center of the screen, or an object at close range.

At Step S3, the microcomputer 232 instructs the imaging element driver 208 to start an imaging operation, with the imaging drive mode of the imaging element 206 set to the first imaging drive mode. In response to the instruction, the imaging element driver 208 executes repeated imaging operations with the imaging element 206 in the first imaging drive mode. Thereafter, the process proceeds to Step S4. The first imaging drive mode is an imaging drive mode for normal live-view display. The setting with the imaging drive mode includes setting of the number of pixels of the imaging element 206 outputting an image signal. Thinning of the image signal is also performed in the first imaging drive mode.

By contrast, the second imaging drive mode is a drive mode set at Step S7 described later. There are cases where the second imaging drive mode is set as the imaging drive mode for still image shooting, and cases where the second imaging drive mode is set as the adjustment live-view mode at Step S12. For example, when the apparatus is set to perform still image shooting in the imaging mode, the imaging drive mode is set to the second imaging drive mode for still image shooting. No thinning of the image signal is performed in the imaging drive mode for still image shooting and the adjustment live-view mode, unlike the imaging drive mode for normal live-view display.

In addition, the setting with the imaging drive mode may include setting of the frame rate. In the imaging drive mode for normal live-view display, for example, processing to reduce the number of pixels outputting an image signal is performed, such as thinning of the image signal, to improve the trackability of imaging for display and reduce the processing load. In the imaging drive mode for normal live-view display, for example, the imaging frame rate is set in accordance with the display frame rate of the display unit 226.

At Step S4, the microcomputer 232 instructs the image processor 222 to perform basic image processing on the image data acquired by an imaging operation. In response to the instruction, the image processor 222 performs basic image processing on the image data stored in the SDRAM 216 as a result of the imaging operation, with the basic image processor 2221. Thereafter, the process proceeds to Step S5. The basic image processing performed at this step is image processing necessary for display on the display unit 226, and includes, for example, white balance (WB) correction processing, color reproduction processing, gradation correction processing, edge emphasis processing, and noise reduction processing.

At Step S5, the microcomputer 232 instructs the display driver 224 to perform live-view display. In response to this instruction, the display driver 224 inputs pieces of image data successively acquired through the imaging element 206 and successively processed with the image processor 222 to the display unit 226. The display unit 226 displays a live view based on the input image data. Thereafter, the process proceeds to Step S6. With the live-view display, the user is enabled to perform framing.

At Step S6, the microcomputer 232 determines whether the release button is operated by the user. At Step S6, when it is determined that the release button is operated, the process proceeds to Step S7. At Step S6, when it is determined that the release button is not operated, the process proceeds to Step S10.

At Step S7, the microcomputer 232 instructs the imaging element driver 208 to set the imaging drive mode of the imaging element 206 to the second imaging drive mode. Thereafter, the process proceeds to Step S8.

At Step S8, the microcomputer 232 sets the shutter speed value. Thereafter, the process proceeds to Step S9. When the shutter speed is not adjusted at Step S15 described later, for example, the value set by the user is used as the shutter speed value, or the value set with the AE processor 218 is used as the shutter speed value. By contrast, when the shutter speed is adjusted at Step S15, the adjusted value is used as the shutter speed value. The aperture value may be set together with setting of the shutter speed value at Step S8.

At Step S9, the microcomputer 232 performs an imaging operation. For example, it is set to perform still image shooting in the imaging mode, the microcomputer 232 instructs the imaging element driver 208 to start an imaging operation, and controls the shutter driver 204 to drive the shutter 202 in accordance with the set shutter speed value. This embodiment illustrates an example in which the exposure time of the imaging element 206 is controlled by driving the shutter 202, but the exposure time of the imaging element 206 maybe controlled with an electronic shutter. After the imaging operation is finished, the microcomputer 232 instructs the image processor 222 to perform basic image processing on the image data acquired by the imaging operation. In response to the instruction, the image processor 222 performs basic image processing on the image data stored in the SDRAM 216 as a result of the imaging operation, with the basic image processor 2221. The basic image processing performed at this step is image processing necessary for recording on the recording medium 230, and includes, such as white balance (WB) correction processing, color reproduction processing, gradation correction processing, edge emphasis processing, noise reduction processing, and compression processing. After the basic image processing is finished, the microcomputer 232 prepares an image file using the image data subjected to the basic image processing, and records the prepared image file on the recording medium 230 through the memory I/F 228. Thereafter, the process proceeds to Step S10. By contrast, when it is set to perform video recording in the imaging mode, the microcomputer 232 instructs the imaging element driver 208 to perform an imaging operation in accordance with the set frame rate. After the imaging operation is finished, the microcomputer 232 instructs the image processor 222 to perform basic image processing on the image data acquired by the imaging operation. In response to the instruction, the image processor 222 performs basic image processing on the image data stored in the SDRAM 216 as a result of the imaging operation, with the basic image processor 2221. After the basic image processing is finished, the microcomputer 232 prepares an image file using the image data subjected to the basic image processing, and records the prepared image file on the recording medium 230 through the memory I/F 228. When an image file has already been prepared, the microcomputer 232 successively records pieces of image data subjected to the basic image processing in the image file prepared before, until an instruction is issued to end the video recording.

At Step S10, the microcomputer 232 determines whether the power button is operated by the user. At Step S10, when the microcomputer 232 determines that the power button is operated, the microcomputer 232 turns off the power of the camera body 200. Thereafter, the process of FIG. 2 is ended. At Step S10, when the microcomputer 232 determines that the power button is not operated, the process returns to Step S1.

At Step S11 serving as start of the adjustment live-view mode, the microcomputer 232 instructs the AF processor 220 to cause the focus lens to be out-of-focus. In response to the instruction, the AF processor 220 requests the lens microcomputer 108 to drive the focus lens until the subject is disposed outside the depth of focus of the focus lens. Thereafter, the process proceeds to Step S12.

At Step S12, the microcomputer 232 instructs the imaging element driver 208 to start an imaging operation, with the imaging drive mode of the imaging element 206 set to the second imaging drive mode. In response to the instruction, the imaging element driver 208 executes repeated imaging operations with the imaging element 206 in the second imaging drive mode. Thereafter, the process proceeds to Step S13. As described above, the second imaging drive mode is an imaging drive mode for still image shooting. Accordingly, the second imaging drive mode may have a frame rate lower than that of the first imaging drive mode. However, by using the image data acquired with the imaging element 206 driven in the second imaging drive mode for live-view display in adjustment, the result of adjustment of the shutter speed value can be directly reflected in imaging, as described later.

At Step S13, the microcomputer 232 instructs the image processor 222 to perform basic image processing and special image processing on the image data acquired by the imaging operation. In response to the instruction, the image processor 222 performs basic image processing on the image data stored in the SDRAM 216 as a result of the imaging operation, with the basic image processor 2221. Thereafter, the image processor 222 performs special image processing on the image data subjected to the basic image processing, to highlight flicker stripes, with the special image processor 2222. Thereafter, the process proceeds to Step S14.

At Step S14, the microcomputer 232 instructs the display driver 224 to perform live-view display. In response to the instruction, the display driver 224 inputs pieces of image data successively acquired through the imaging element 206 to the display unit 206. The display unit 226 displays a live view based on the input image data. Thereafter, the process proceeds to Step S15.

At Step S15, the microcomputer 232 adjusts the shutter speed value, in accordance with user's operations. The following is detailed explanation of processing of adjustment of the shutter speed value. FIG. 3 is a diagram for explaining an outline of adjustment of the shutter speed value in the adjustment live-view mode.

As described above, in the adjustment live-view mode, the imaging drive mode of the imaging element 206 is set to the second imaging drive mode. In the adjustment live-view mode, live-view display is performed, on the basis of image data subjected to special image processing to highlight flicker stripes. The user operates the operating unit 236, while observing such a live view. In response to the operation of the operating unit 236, the microcomputer 232 adjusts the shutter speed value. When the shutter speed value is adjusted, the exposure time of the imaging element 206 is changed, and the appearance of flicker stripes on the screen of the display unit 226 changes. For example, when the shutter speed value is not natural number times as large as the flicker frequency, clear flicker stripes appear on the screen, as illustrated in FIG. 3 (a). By contrast, as the shutter speed value becomes closer to a value natural number times as large as the flicker frequency, flicker stripes on the screen fade away, as illustrated in FIG. 3 (b). When the shutter speed value becomes equal to a value natural number times as large as the flicker frequency, the flicker stripes on the screen completely disappear, as illustrated in FIG. 3 (c). In this state, the user operates the operating unit 236, to finish the adjustment of the shutter speed value.

Figure 4:
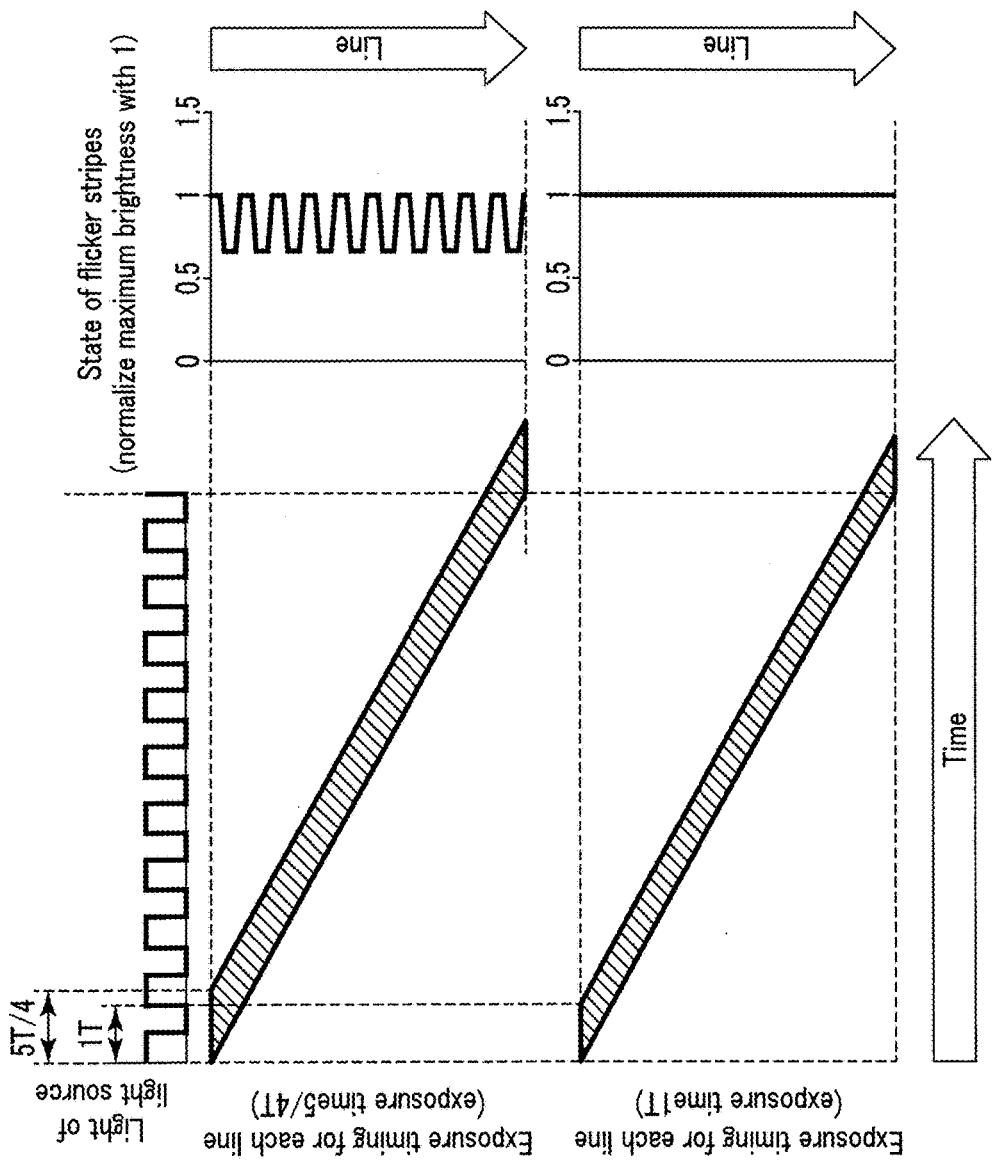
FIG. 4 is a diagram for explaining relation between the shutter speed value and flicker stripes.

The following is further explanation of the relation between the shutter speed value and flicker stripes. FIG. 4 is a diagram for explaining the relation between the shutter speed value and flicker stripes. In the explanation of FIG. 4, suppose that the light source is a LED light source flickering at cycles T, for example.

When the drive method of the imaging element 206 is a rolling-shutter method, as illustrated in FIG. 4, the exposure timing is gradually shifted for each line from the upper end line to the lower end line of the imaging element 206.

When the exposure time of each line is 5T/4, the rate of the time in which the light source is bright in the exposure time changes according to the exposure timing. The rate is 3/5 at the maximum, and 2/5 at the minimum. The fact that the rate of the time in which the light source is bright in the exposure time changes according to the exposure timing means that the flickering state of the light source changes for each of the lines of the imaging element 206. The change in flickering of the light source in each of the lines appears as flicker stripes in the image acquired by imaging.

By contrast, when the exposure time of each line is T, the rate of the time in which the light source is bright in the exposure time does not change according to the exposure timing. Specifically, the rate is always 1/2. As described above, when the exposure time of each line is T, the flickering state of the light source for each line of the imaging element 206 is not changed. Accordingly, no flicker stripes appear in the image acquired by imaging. Although FIG. 4 illustrates the state of flicker stripes when the exposure time of each line is T, no flicker stripes appear in the image acquired by imaging, when the exposure time of each line is natural number times as large as T.

As described above, occurrence of flicker stripes is suppressed by adjustment of the shutter speed value (exposure time of the imaging element 206). In the adjustment live-view mode, the imaging drive mode is set to the second imaging drive mode, that is, the imaging drive mode in shooting. Accordingly, when shooting is performed with the adjusted shutter speed value, no flicker stripes occur on the image in shooting.

However, it is difficult for the user to judge whether flicker stripes disappear on the screen, without any assistance. Accordingly, in the adjustment live-view mode according to the present embodiment, special image processing to emphasize flicker stripes is performed, and thereafter live-view display is performed, to cause the user to easily judge whether flicker stripes disappear.

Figure 5:
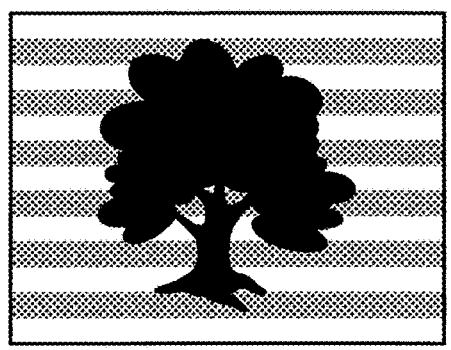
FIG. 5 is a diagram illustrating an example of live-view display in a state in which contrast emphasis processing is performed.

FIG. 5 is a diagram illustrating an example of live-view display in the state where contrast emphasis processing is performed as an example of the special image processing. The contrast emphasis processing is performed by uniformly subjecting the image data to gradation correction processing to emphasize the contrast more than in normal gradation correction processing. The contrast emphasis processing emphasizes the difference in brightness. Accordingly, as long as flicker stripes occur on the screen, the flicker stripes are emphasized. This structure enables the user to easily judge whether flicker stripes disappear.

Figure 6:
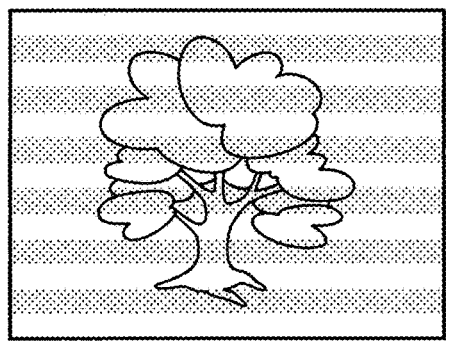
FIG. 6 is a diagram illustrating an example of live-view display in a state in which local contrast emphasis processing is performed.

FIG. 6 is a diagram illustrating an example of live-view display in the state where local contrast emphasis processing is performed as an example of the special image processing. The local contrast emphasis processing is performed by performing gradation correction processing of different characteristics on respective local regions. Flicker stripes can be emphasized also with local contrast emphasis processing.

Figure 7:
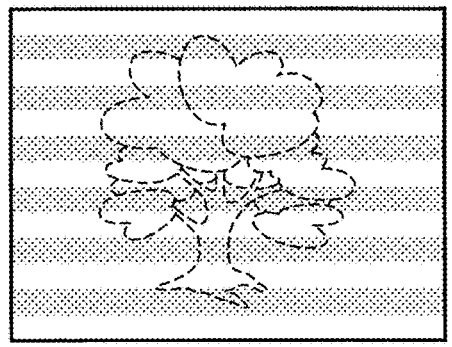
FIG. 7 is a diagram illustrating an example of live-view display in a state in which local contrast emphasis processing is performed after a lens is driven to be out-of-focus for the subject.

FIG. 7 is a diagram illustrating an example of live-view display in the state where local contrast emphasis processing serving as an example of the special image processing is performed after the lens is driven to be out-of-focus for the subject.

When contrast emphasis processing is performed as explained with reference to FIG. 5, gradation correction processing is performed with uniform characteristic on the image data. Such processing emphasizes the contrast of the subject as well as the flicker stripes, and may deteriorate the visibility of flicker stripes under certain environmental conditions of the subject field.

In the same manner, the local contrast emphasis processing explained with reference to FIG. 6 also emphasizes the contrast of the subject, and the subject with the emphasized contrast may deteriorate the visibility of flicker stripes. Accordingly, the lens is driven to be out-of-focus for the subject, to further improve the visibility of flicker stripes.

Figure 8A:
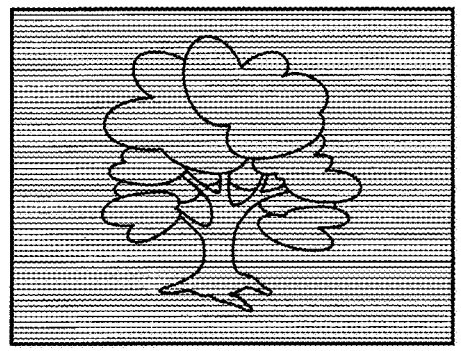
FIG. 8A is a diagram illustrating an example of live-view display of many flicker stripes.

In addition, when the imaging element 206 includes a large number of lines or the flicker frequency is high, the number of flicker stripes increases, as illustrated in FIG. 8A. In such a case, flicker stripes may be invisible, even when only simple contrast emphasis is performed.

Figure 8B:
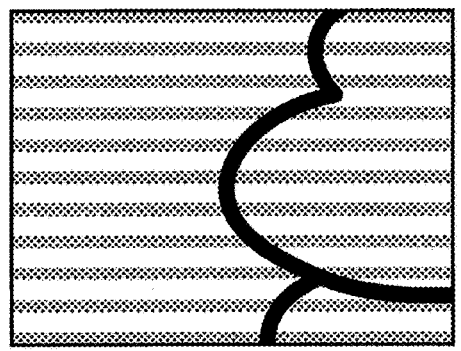
FIG. 8B is a diagram illustrating an example of enlarged live-view display of flicker stripes.

As measures for the case where flicker stripes increases, a predetermined range (such as a part around the center part, and a peripheral portion of the subject) in the image data subjected to special image processing to emphasize the flicker stripes may be trimmed, and the trimmed predetermined range may be displayed in an enlarged state, as illustrated in FIG. 8B. Such enlarged display may be performed by subjecting the trimmed image data to special image processing. The enlarged display as illustrated in FIG. 8B enables the user to easily judge whether flicker stripes disappear, even when the number of flicker stripes increases.

Figure 8C:
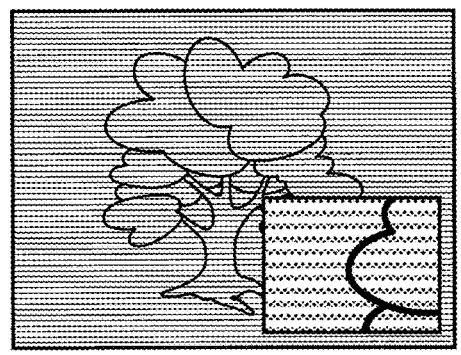
FIG. 8C is a diagram illustrating an example of live-view display in which the enlarged image is superimposed on the whole image.

As illustrated in FIG. 8C, the enlarged image may be displayed to be superimposed on the whole image. The display as illustrated in FIG. 8C enables the user to adjust the shutter speed value using the enlarged image, while performing framing using the whole image. In the display illustrated in FIG. 8C, basic image processing may be performed on the whole image, and special image processing may be performed on the enlarged image. This structure enables execution of excellent framing, while securing visibility of flicker stripes.

In the adjustment live-view mode of FIG. 2, out-of-focus on the subject is always performed at Step S11. However, in the adjustment live-view mode, out-of-focus on the subject is not always performed. Specifically, in the adjustment live-view mode, it suffices that at least one of the displays in FIG. 5, FIG. 6, FIG. 7, FIG. 8B, and FIG. 8C is performed. As another example, the displays in FIG. 5, FIG. 6, FIG. 7, FIG. 8B, and FIG. 8C may properly be used in combination. As another example, a structure may be adopted to enable the user to select any of the displays in FIG. 5, FIG. 6, FIG. 7, FIG. 8B, and FIG. 8C. In addition, because it suffices that flicker stripes is displayed in an emphasized state in the special image processing of the present embodiment, any display other than those in FIG. 5, FIG. 6, FIG. 7, FIG. 8B, and FIG. 8C may be performed in the adjustment live-view mode.

FIG. 2 will be explained hereinafter again. At Step S16 after the start of shutter speed adjustment, the microcomputer 232 determines whether the shutter speed adjustment is finished, that is, whether the user performs an operation to finish the shutter speed adjustment. At Step S16, when the microcomputer 232 determines that shutter speed adjustment is not finished, the process returns to Step S12. At Step S16, when the microcomputer 232 determines that shutter speed adjustment is finished, the process returns to Step S1.

As explained above, in the present embodiment, live-view display is performed in the state where special image processing is performed to emphasize flicker stripes in the adjustment live-view mode. This structure enables the user to observe flicker stripes on the screen, even when the flicker frequency increases. As described above, the present embodiment enables the user to detect flicker stripes on the screen, regardless of the flicker frequency.

In addition, in the present embodiment, the imaging drive mode of the imaging element 206 is set to the second imaging drive mode serving as the imaging drive mode for still image shooting, in the adjustment live-view mode. This structure enables reflection of the shutter speed value adjusted in the adjustment live-view mode on still image shooting directly.

The present invention has been explained above based on the embodiment, but the present invention is not limited to the embodiment described above. For example, the present embodiment illustrates an imaging apparatus accompanied with recording of image data, such as a digital camera. However, the imaging apparatus of the present embodiment is not always an imaging apparatus accompanied with recording of image data. The imaging apparatus of the present embodiment maybe an imaging apparatus of various types, such as an imaging apparatus in the digital microscope field, in the industrial endoscope field, and other imaging apparatuses accompanied with imaging under flickering light sources.

In the explanation of the flowchart of the operations described above, the operations are explained with the terms "first", "thereafter", and the like for the convenience' sake, but these terms do not mean that the operations should be indispensably performed in this order.

Each of the processes according to the embodiment described above maybe stored as a program that can be executed by the microcomputer 232. The program may be stored and distributed in a storage medium of an external storage device, such as a memory card (such as a ROM card and a RAM card), a magnetic disk (such as a hard disk), an optical disc (such as a CD-ROM and a DVD), and a semiconductor memory. The microcomputer 232 can execute the processes described above, by reading the program stored in the storage medium of the external storage device, and controlled by the read program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
a pixel-based imaging element which images a subject field to generate an image, in a set imaging drive mode in at least two modes of a first imaging drive mode suitable for live-view display and a second imaging drive mode suitable for still image shooting, wherein the first imaging drive mode is a mode of thinning a part of an image signal in a generated image and providing an output, and the second imaging drive mode is a mode of not thinning an image signal in a generated image and providing an output;
an image processor which subjects the image generated by the pixel-based imaging element to basic image processing serving as image processing necessary for display, and special image processing, if necessary, the special image processing including image processing to emphasize flicker stripes occurring in the image;
an operating unit including at least one of an operating button, an operating member and a touch panel, to set a mode of the live-view display to a normal live-view mode or an adjustment live-view mode, wherein the normal live-view mode is a mode of performing display to allow a user to perform framing, and the adjustment live-view mode is a mode of performing display to allow the user to perform adjustment to suppress occurrence of flicker stripes; and
a controller which sets the imaging drive mode to the first imaging drive mode and instructs the image processor to perform the basic image processing, when the normal live-view mode is set, and sets the imaging drive mode to the second imaging drive mode and instructs the image processor to perform the basic image processing and the special image processing, when the adjustment live-view mode is set.

2. The imaging apparatus according to claim 1, wherein the imaging drive mode includes setting of number of pixels generating the image in the pixel-based imaging element, and
the number of pixels in the first imaging drive mode is smaller than the number of pixels in the second imaging drive mode.

3. The imaging apparatus according to claim 1, wherein the image processor performs processing to extract a predetermined range of the image generated in the pixel-based imaging element, as the special image processing.

4. The imaging apparatus according to claim 1, wherein the image processor performs processing to emphasize contrast of the image generated in the pixel-based imaging element, as the special image processing.

5. The imaging apparatus according to claim 1, wherein the image processor performs processing to emphasize contrast of the image generated in the pixel-based imaging element for each of local regions of the image, as the special image processing.

6. The imaging apparatus according to claim 1, further comprising:
a focus lens; and
a driver driving the focus lens,
wherein the controller controls the driver to focus the focus lens on the subject, when the normal live-view mode is set, and controls the driver to cause the focus lens to be out-of-focus for the subject, when the adjustment live-view mode is set.

7. The imaging apparatus according to claim 1, wherein the operating unit includes an operating member to set a shutter speed value of the pixel-based imaging element, in the adjustment live-view mode.

8. The imaging apparatus according to claim 1, further comprising:
a display displaying the image,
wherein the controller controls live-view display to cause the display to perform display successively based on images generated by repeated operations of the pixel-based imaging element.

9. An imaging method comprising:
imaging a subject field to generate an image, in a set imaging drive mode in at least two modes of a first imaging drive mode suitable for live-view display and a second imaging drive mode suitable for still image shooting, wherein the first imaging drive mode is a mode of thinning a part of an image signal in a generated image and providing an output, and the second imaging drive mode is a mode of not thinning an image signal in a generated image and providing an output;
setting a mode of live-view display to a normal live-view mode or an adjustment live-view mode, wherein the normal live-view mode is a mode of performing display to allow a user to perform framing, and the adjustment live-view mode is a mode of performing display to allow the user to perform adjustment to suppress occurrence of flicker stripes; and
setting the imaging drive mode to the first imaging drive mode to perform imaging repeatedly, and subjecting the generated image to basic image processing serving as image processing necessary for display, when the normal live-view mode is set, and setting the imaging drive mode to the second imaging drive mode to perform imaging repeatedly, and subjecting the generated image to the basic image processing and special image processing, when the adjustment live-view mode is set, the special image processing including image processing to emphasize flicker stripes occurring in the image.

10. A computer-readable non-transitory recording medium recording an imaging program to be executed by a computer of an imaging apparatus, the imaging program including:
imaging a subject field to generate an image, in a set imaging drive mode in at least two modes of a first imaging drive mode suitable for live-view display and a second imaging drive mode suitable for still image shooting, wherein the first imaging drive mode is a mode of thinning a part of an image signal in a generated image and providing an output, and the second imaging drive mode is a mode of not thinning an image signal in a generated image and providing an output;
setting a mode of live-view display to a normal live-view mode or an adjustment live-view mode, wherein the normal live-view mode is a mode of performing display to allow a user to perform framing, and the adjustment live-view mode is a mode of performing display to allow the user to perform adjustment to suppress occurrence of flicker stripes; and
setting the imaging drive mode to the first imaging drive mode to perform imaging repeatedly, and subjecting the generated image to basic image processing serving as image processing necessary for display, when the normal live-view mode is set, and setting the imaging drive mode to the second imaging drive mode to perform imaging repeatedly, and subjecting the generated image to the basic image processing and special image processing, when the adjustment live-view mode is set, the special image processing including image processing to emphasize flicker stripes occurring in the image.

* * * * *